United States Patent [19]

Chuang et al.

[11] Patent Number: 5,746,956
[45] Date of Patent: May 5, 1998

[54] PROCESS AND APPARATUS FOR MANUFACTURING ALUMINUM LAMINALLY FILLED PLASTIC PELLETS FOR SHIELDING ELECTROMAGNETIC INTERFERENCE

[75] Inventors: Tung-Han Chuang, Taoyuan; Ching-Bin Lin, Taipei; Teng-Chun Tsai, Taipei; Jiin-Chyuan Chang, Taipei, all of Taiwan

[73] Assignee: National Science Council, Taipei, Taiwan

[21] Appl. No.: 743,447

[22] Filed: Nov. 1, 1996

[51] Int. Cl.$^6$ ........................................... B29B 9/04
[52] U.S. Cl. .................... 264/104; 264/141; 264/171.16; 264/171.21; 264/210.2; 425/114; 425/296; 425/308; 425/327
[58] Field of Search ...................... 264/104, 129, 264/136, 137, 141, 175, 171.14, 171.16, 171.17, 171.21, 210.2, 280; 425/90, 113, 114, 308, 133.5, 296, 315, 316, 327, 377

[56] References Cited

U.S. PATENT DOCUMENTS

| | | | |
|---|---|---|---|
| 3,301,932 | 1/1967 | Chisholm | 264/171.21 |
| 4,379,098 | 4/1983 | Gumienny | 264/104 |
| 4,474,685 | 10/1984 | Annis | 264/104 |
| 4,627,138 | 12/1986 | Im | 264/104 |
| 5,531,851 | 7/1996 | Lin et al. | 264/136 |

FOREIGN PATENT DOCUMENTS

| | | | |
|---|---|---|---|
| 57-31549 | 2/1982 | Japan | 264/171.21 |
| 61-51311 | 3/1986 | Japan | 264/104 |
| 61-293827 | 12/1986 | Japan | 264/104 |

*Primary Examiner*—Mathieu D. Vargot
*Attorney, Agent, or Firm*—Townsend and Townsend and Crew LLP

[57] ABSTRACT

The present invention provides novel kind of aluminum laminally filled plastic pellets and a process and apparatus for manufacturing the plastic pellets. The process includes coating the upper and lower surfaces of each of the substantially parallel lined aluminum foil layers with a coupling agent; drying the aluminum foil layers; introducing a molten plastic matrix to the space between each two aluminum foil layers and the outer surfaces of the most outside two aluminum foil layers to moisturize and bind the aluminum foil layers; reducing the thickness of the aluminum foil layers to form a continuous laminally filled plastic composite plate; and cooling and cutting the composite plate into aluminum laminally filled plastic pellets of a predetermined size. The aluminum contained in the plastic pellet maintains a high aspect ratio, therefore, reducing the loading amount of the aluminum required to provide good EMI shielding of the plastic pellets, while not adversely affeting the mechanical properties of the EMI plastic product.

27 Claims, 3 Drawing Sheets

PROCESS AND APPARATUS FOR MANUFACTURING ALUMINUM LAMINALLY FILLED PLASTIC PELLETS FOR SHIELDING ELECTROMAGNETIC INTERFERENCE

BACKGROUND OF THE INVENTION

1. Field of the Invention

The present invention relates to aluminum laminally filled plastic pellets for shielding against electromagnetic interference (EMI), more particularly relates to a process and apparatus for manufacturing the aluminum laminally filled plastic pellets using aluminum foil as a starting filler.

2. Description of the Prior Art

In recent years, progress of technology has led to an extensive increase in the amount of sophisticated electronic equipment. However, the high-density electromagnetic waves produced from electronic equipment have the potential to damage or adversely affect the performance of other equipment or components. Also, exposure to electromagnetic waves is harmful to the human body. Therefore, an electrically conductive outer shell is needed to shield electromagnetic interference (EMI) produced from electronic equipment.

Heretofore, various methods have been used to shield electronic equipment. Metallic boxes and cans fabricated from steel, copper, aluminum, etc., were used by surrounding high EMI emitters for shielding. However, because shields fabricated from metal were cumbersome, heavy and costly, the electronics industry has resorted to metallized plating on plastics. But, the results obtained with metallic coatings were not always satisfactory. In addition to being relatively non-economic, once such metallic coatings were scratched through, they would lose part of their shielding efficiency. Unless such conductive coatings are continuous and free of voids, electromagnetic waves will be free to pass through. Frequently, it was difficult to obtain a dependable, 100% effective coating which was also resistant to peeling.

Further efforts by the electronics industry to develop more dependable light-weight materials for EMI shielding has led to a third approach, namely electrically conductive component-filled plastic composites. It was anticipated that intricate shapes could be molded from the composite materials by conventional means, yielding a finished part that promised to be more economic and dependable than metal or metal-coated plastics.

The principle factor influencing the performance of conductive component-filled plastic composites is the aspect ratio of the conductive fillers. The aspect ratio is defined as the ratio of the maximum dimension to the minimum dimension of the filler. For example, the aspect ratio of a fiber is the ratio of the length to the diameter of the fiber. According to the electromagnetic wave percolation theory, if the conductive filler in the plastic retains a higher aspect ratio, the filler easily forms a conductive network, thus, the critical concentration of the conductive filler required to achieve the electromagnetic shielding effect (that is, the threshold percolation concentration) is lower.

The method for preparing conductive component-filled plastic composites can be classified into two types. The first type involves compounding the conductive fillers in the form of powders, short fibers or flakes with the plastic matrix, and then the mixture is hot-pressed molded or injection molded into various kinds of plastic products for shielding EMI.

For example, U.S. Pat. No. 4,474,685 discloses a process for fabricating electromagnetic shielding products by first compounding and then moulding a molding composition including a thermosetting resin binder and an electrically conductive filler (including carbon black, graphite and conductive metal powders). However, during the compounding with the resin matrix, the conductive powders may easily cluster, thus are not capable of dispersing in the resin matrix, consequently, the electromagnetic shielding efficiency of the molded products can not be effectively improved. Furthermore, since the powder filler has a lower aspect ratio, according to the electromagnetic wave percolation theory as mentioned above, the addition amount (i.e., threshold percolation concentration) of the powder filler must be relatively high to achieve electrical conductivity. Consequently, the mechanical properties, color and other physical and chemical properties of the molded products are adversely affected. Alternatively, if the conductive filler is in a higher aspect ratio form such as fibers or flakes, although the filler can be loaded to a lower level, the cluster phenomenon is still difficult to prevent. In addition, during the compounding process, in order to maintain the original aspect ratio, the conductive filler should be strong enough to prevent brittleness due to compounding. However, such a strong conductive filler is very expensive, and is thus not suitable for ordinary low cost electronic equipment.

The second type of method for preparing conductive component-filled plastic composites involves binding a plastic layer to enclose the conductive filler by immersion or extrusion, and then cutting the conductive long fiber-filled plastic stick to a predetermined length. For example, Japanese Patent No. 60-112854 discloses a process including continuous extruding thermoplastic plastic to enclose a copper fiber to form a copper fiber-filled plastic round stick, and then cutting the plastic round stick into pellets of a predetermined size. In order to increase the aspect ratio of the filler, the diameter of the conductive long fiber should be as small as possible. The fibrous filler must be strong enough to prevent breakage. However, such strong fibrous filler, such as stainless steel fiber, copper fiber or metal-coated carbon fiber, is very expensive.

To decrease the total cost for the production of conductive component-filled plastic composites, aluminum filler which has the advantages of low price, low density, excellent electromagnetic shielding efficiency, and easy of color matching has already been used. When aluminum flakes are applied to the first type method for preparing aluminum-filled plastic composites, the process involves compounding aluminum flakes with plastic. Since aluminum has low strength, the aluminum flakes extensively break during the compounding process, resulting in a rapid decrease of the aspect ratio. Therefore, the incorporation amount (threshold percolation concentration) should be increased to a very high level (generally, as high as up to 30 to 40%) to achieve the acceptable electromagnetic shielding efficiency. The consequence is that the total cost is increased, and more seriously, the obtained electromagnetic shielding plastic products have poor mechanical properties, for example, elongation, tensile strength, bending strength and impact strength are all adversely affected.

When aluminum fiber is applied to the second type of method for preparing aluminum-filled plastic composites, the process involves binding a plastic layer to enclose the aluminum fiber by immersion or extrusion. Again, since the diameter of the aluminum fiber is very small and the aluminum has low strength, the aluminum fibers easily break, resulting in a rapid decrease of the aspect ratio.

According to the above description, although aluminum has the advantages of low price, low density, excellent electromagnetic shielding efficiency, and easy of color matching, since it has a very low strength, when aluminum is used as the filler for preparing the plastic composite, it easily breaks during the processing. Therefore, the incorporation amount of aluminum should be increased to a very high level to achieve an acceptable degree of electromagnetic shielding efficiency, and the obtained electromagnetic shielding plastic products have poor mechanical properties.

SUMMARY OF THE INVENTION

An object of the present invention is to solve the above-mentioned problems and to provide a novel kind of aluminum filled plastic pellets which can be used for fabricating EMI shielding plastic shaped articles. The aluminum contained in the plastic pellet maintains a high aspect ratio, therefore, lower loading amount of the aluminum is required to provide good EMI shielding efficiency of the plastic pellets, and the mechanical properties of the EMI plastic product are not adversely affected.

One aspect of the present invention is that the filler starting material used for the plastic pellets is aluminum foil, and the aluminum foil is laminally filled in the plastic matrix. Since the width of the aluminum foil can be adjusted as desired to meet the strength requirements, the aluminum foil does not easily break during the manufacturing of the plastic pellets. Therefore, the aluminum filler maintains a high aspect ratio during manufacture, only a small amount of the aluminum filler is required to achieve electromagnetic shielding efficiency, and the mechanical properties of the resultant aluminum filled plastic pellets are not affected.

To achieve the above object, the aluminum laminally filled plastic pellets of the present invention comprise a plurality of aluminum foil layers and a plurality of plastic layers, which are stuck together in turn. The outer layers are plastic layers.

In accordance with the present invention, the aluminum laminally filled plastic pellets for shielding electromagnetic interference of the present invention can be manufactured by a new process comprising the following sequential steps:

(a) lining a plurality of aluminum foil layers such that the aluminum foil layers are substantially parallel to one another, wherein the aluminum foil is made of pure aluminum or is made of aluminum alloy;

(b) coating the upper and lower surfaces of each of the aluminum foil layers with a coupling agent by immersion or spraying;

(c) drying the coupling agent-coated aluminum foil layers;

(d) introducing a molten plastic matrix to the space between each two aluminum foil layers and the outer surfaces of the most outside two aluminum foil layers, such that the upper and lower surfaces of all aluminum foil layers are moisturized and bound by the molten plastic matrix;

(e) reducing the thickness of the moisturized and bound aluminum foil layers to form a continuous laminally filled plastic composite plate; and (f) cooling and then cutting the aluminum laminally filled plastic composite plate into aluminum laminally filled plastic pellets of a predetermined size.

In accordance with a preferred embodiment of the invention, the aluminum laminally filled plastic pellets can be manufactured by an apparatus comprising:

means for conveying a plurality of aluminum foil layers such that the conveyed aluminum foil layers are arranged substantially parallel, wherein the aluminum foil is made of pure aluminum or is made of aluminum alloy;

means for spraying a coupling agent on the upper and lower surfaces of each of the aluminum foil layers, disposed downstream of the conveying means;

means for drying the coupling agent on the surfaces of the aluminum foil layers, disposed downstream of the spraying means;

a die disposed downstream of the drying means, the die being attached to an extrusion machine, the extrusion machine being capable of extruding a molten plastic matrix into the die, the die on its one wall adjacent to the drying means being provided with a first plurality of slits equal in quantity to the quantity of the aluminum foil layers, the die on its another wall apart from the drying means being provided with an extrusion exit, whereby each of the dried aluminum foil layers is capable of passing through each of the first slits respectively to enter into the die, and is capable of being moisturized and bound by the molten plastic matrix received in the die, and then the moisturized and bound aluminum foil layers are capable of being extruded through the extrusion exit to form an aluminum laminally filled plastic composite plate;

means for cooling the aluminum laminally filled plastic composite plate, disposed downstream of the extrusion exit; and means for cutting the composite plate into aluminum laminally filled plastic pellets of a predetermined size, disposed downstream of the cooling means.

In another preferred embodiment of the invention, the aluminum laminally filled plastic pellets can be manufactured by an apparatus comprising:

means for conveying a plurality of aluminum foil layers such that the conveyed aluminum foil layers are arranged substantially parallel, wherein the aluminum foil is made of pure aluminum or is made of aluminum alloy;

means for spraying a coupling agent on the upper and lower surfaces of each of the aluminum foil layers, disposed downstream of the conveying means;

means for drying the coupling agent on the surfaces of the aluminum foil layers, disposed downstream of the spraying means;

a plurality of dies attached to an extrusion machine, disposed downstream of the drying means, and having a quantity of one greater than the quantity of the aluminum foil layers, wherein each of the dies at one side apart from the drying means is provided with a long strip-shaped slit with a width substantially equal to the width of each of the aluminum foil layers, whereby each of the dried aluminum foil layers is capable of entering into the space between each two dies, the extrusion machine is capable of extruding a molten plastic matrix to the dies, and the molten plastic matrix is capable of passing through the slits on the dies and entering into the space between each two aluminum foil layers and the outer surfaces of the most outside two aluminum foil layers, such that the upper and lower surfaces of all aluminum foil layers are moisturized and bound by the molten plastic matrix;

at least one pair of hot rollers, disposed downstream of the long strip-shaped exits, for hot reducing the thickness of the moisturized and bound aluminum foil layers to form an aluminum laminally filled plastic composite plate;

means for cooling the aluminum laminally filled plastic composite plate, disposed downstream of the hot rollers; and means for cutting the composite plate into aluminum laminally filled plastic pellets of a predetermined size, disposed downstream of the cooling means.

Further applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, given by way of illustration only and thus not intended to be limitative of the present invention, wherein.

DETAILED DESCRIPTION OF THE PREFERRED EMBODIMENTS

According to the present invention, the aluminum laminally filled plastic composite plate for shielding electromagnetic interference includes a plurality of aluminum foil layers and a plurality of plastic layers. The aluminum foil layers and the plastic layers are stuck together in turn, and the outer layers are plastic layers. The plastic composite plate can be cut into aluminum laminally filled plastic pellets of a predetermined size.

The aluminum foil used herein is made of pure aluminum or is made of aluminum alloy. For example, the aluminum foil can be pure aluminum foil for domestic wrapping use, industrial used aluminum foil of higher degree of purity, or alloyed aluminum foil of higher strength such as 2024 Al-Cu.

The aluminum laminally filled plastic composite plate and plastic pellets for shielding against electromagnetic interference can be manufactured by the following sequential steps. First, a plurality of aluminum foil layers are lined such that the aluminum foil layers are substantially parallel to one another. The upper and lower surfaces of each of the aluminum foil layers are coated with a coupling agent by immersion or spraying. The coupling agent-coated aluminum foils are then dried.

Subsequently, a molten plastic matrix is introduced to the space between each two aluminum foil layers and the outer surfaces of the most outside two aluminum foil layers, such that the upper and lower surfaces of all aluminum foil layers are moisturized and bound by the molten plastic matrix.

The thickness of the moisturized and bound aluminum foils is reduced to form a continuous laminally filled plastic composite plate. To obtain pellets, the plastic composite plate is cooled and then cut into aluminum laminally filled plastic pellets of a predetermined size.

According to the present invention, the introduction of the molten plastic matrix is preferably conducted by extrusion.

Figure 1:
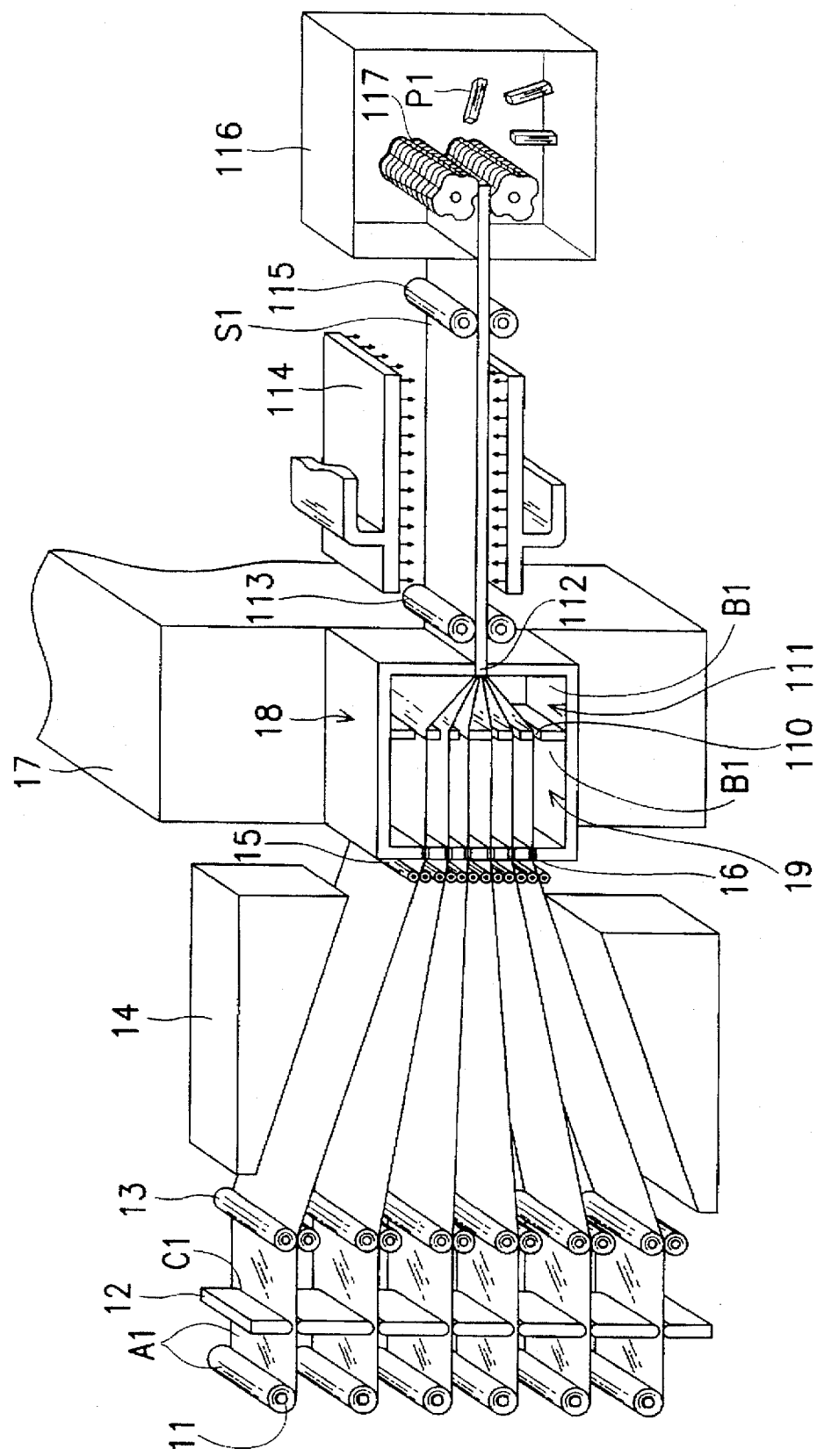
FIG. 1 shows a schematic diagram of the first preferred embodiment of the apparatus for manufacturing the aluminum laminally filled plastic pellets of the present invention.

Referring now to FIG. 1, which shows an apparatus for manufacturing the aluminum laminally filled plastic pellets according to the first embodiment of the present invention. The apparatus includes, from upstream to downstream, a conveying means 11, a spraying means 12, a first plurality of pairs of rollers 13, a drying means 14, a second plurality of pairs of rollers 15, a die 18, a cooling means 114, and a cutting means 116.

The conveying means can be a plurality of conveying spools 11, with suitable distance from one another, which are used for conveying a plurality of aluminum foil layers A1. There are preferably 1 to 10 aluminum foil layers A1 (6 layers are shown in FIG. 1). There is an equal quantity of conveying spools 11 to the number of the aluminum foil layers A1, whereby each of the aluminum foil layers A1 is coiled up on each of the conveying spools 11 respectively.

The spraying means can be a plurality of spraying devices 12, which are used for spraying a coupling agent C1 on the aluminum foil layers A1. The quantity of spraying devices 12 exceeds the quantity of the aluminum foil layers A1 by one. Two of the spraying devices 12 are respectively disposed adjacent to the most outside two aluminum foil layers A1, and the rest of the spraying devices 12 are disposed between each two aluminum foil layers.

The coupling agent suitable for use in the present invention is selected from the group consisting of silanes, titantates, zirconates and aluminates. The plastic matrix used in the present invention is preferably a thermoplastic so as to maintain in its molten form. Representative examples of the thermoplastics includes acrylonitrile-butadiene-styrene (ABS), polystyrene (PS), polyphenylene oxide (PPO) and acrylonitrile-butadiene-styrene/polycarbonate (ABS/PC).

The first plurality of pairs of rollers 13 have twice the quantity of the number of aluminum foil layers A1, whereby each pair of the first rollers 13 is capable of guiding each aluminum foil layer A1 respectively.

The drying means 14 is used for drying the coupling agent C1 on the surfaces of the aluminum foil layers A1.

The second plurality of pairs of rollers 15 have twice the quantity of the number of aluminum foil layers A1, whereby each pair of the second rollers 15 is capable of guiding each aluminum foil layer A1 respectively.

The die 18 is attached to an extrusion machine 17. The extrusion machine 17 is capable of extruding a molten plastic matrix into the die 18. The die 18 on its one wall adjacent to the drying means 14 is provided with a first plurality of slits 16 equal in quantity to that of the aluminum foil layers A1. The distance between each of the first slits 16 is about 5–10 mm such that the distance between each of the aluminum foil layers A1 in the die 18 is also kept within such range, therefore, such distance between the aluminum foil layers is adequate to accommodate the molten plastic matrix in order to moisturize and bind the aluminum foil layers A1. The size of the opening for each of the first slits 16 should be as small as possible, about 0.02–0.03 mm, such that the aluminum foil layers A1 can just pass through. The die 18 on its another wall apart from the drying means 14 is provided with an extrusion exit 112. The size of the opening of the extrusion exit 112 is exactly the desired thickness of the obtained aluminum laminally filled plastic composite plate, about 0.1–2 mm. Inside the die 18, a second plurality of slits 110 is provided in equal quantity to the quantity of the aluminum foil layers A1. The size of the opening of each of the second slits 110 is about 2 mm. By the second slits 110, the die 18 is divided into a binding room 19 and an extruding room 111.

In operation, each of the plurality of aluminum foil layers A1 having a thickness of about 0.01–0.02 mm is coiled up on each of the conveying devices 11 such that the conveyed aluminum foil layers A1 are arranged substantially parallel. The aluminum foil layers A1 are then sprayed by the spraying devices 12. By the location of the spraying devices 12, the upper and lower surfaces of each of the aluminum foil layers A1 can be sprayed with coupling agent C1. Then, each of the aluminum foil layers A1 is guided by each pair of the first roller pairs 13 respectively to enter into the drying means 14. The coupling agent C1 on the aluminum foil layers A1 can be dried by the drying means 14. After drying, each of the aluminum foil layers A1 is guided by each pair of the second pairs of the rollers 15 to enter through each of the first plurality of slits 16 into the binding room 19 of the die 18.

A molten plastic matrix B1 is extruded from the extrusion machine 17 into the binding room 19 of the die 18. In the binding room 19, the aluminum foil layers A1 are moisturized and bound by the molten plastic matrix B1 and then each of the aluminum foil layers A1 pass through each of the second slits 110 into the extruding room 111. The temperature of the extruding room 111 is lower than that of the binding room 19 by approximately 30° to 60° C., so as to increase the viscosity of the molten plastic matrix B1, thus preventing a large degree of difference in the distance between the aluminum foil layers and preventing the aluminum foil layers from becoming entangled with each other.

The moisturized and bound aluminum foil layers A1 are then extruded from the extruding room 111 through the extrusion exit 112 to form an aluminum laminally filled plastic composite plate S1. The thickness of the composite plate S1 is exactly the thickness of the extrusion exit 112, about 0.1–2 mm. The extruded aluminum laminally filled plastic composite plate S1 which is not totally hardened is guided by a pair of rollers 113 to the cooling means 114, such as a cooling tank or a cool water spraying device, to cool and harden the composite plate S1. And then the composite plate S1 is guided by another pair of rollers 115 to the cutting means 116. The cutting means can be, for example, a pair of shredding steel roller blades 117 to directly cut the cooled and hardened composite plate S1 into rectangular shaped, about 0.7–2 mm wide, 5–10 mm long, and 0.1–2 mm thick aluminum laminally filled plastic pellets P1. Alternatively, the composite plate S1 can first be cut by a planar steel blade into 0.7–2 mm wide, 0.1–2 mm thick aluminum filled plastic strips, then the strip is cut into 5–10 long aluminum filled plastic pellets P1.

Figure 2:
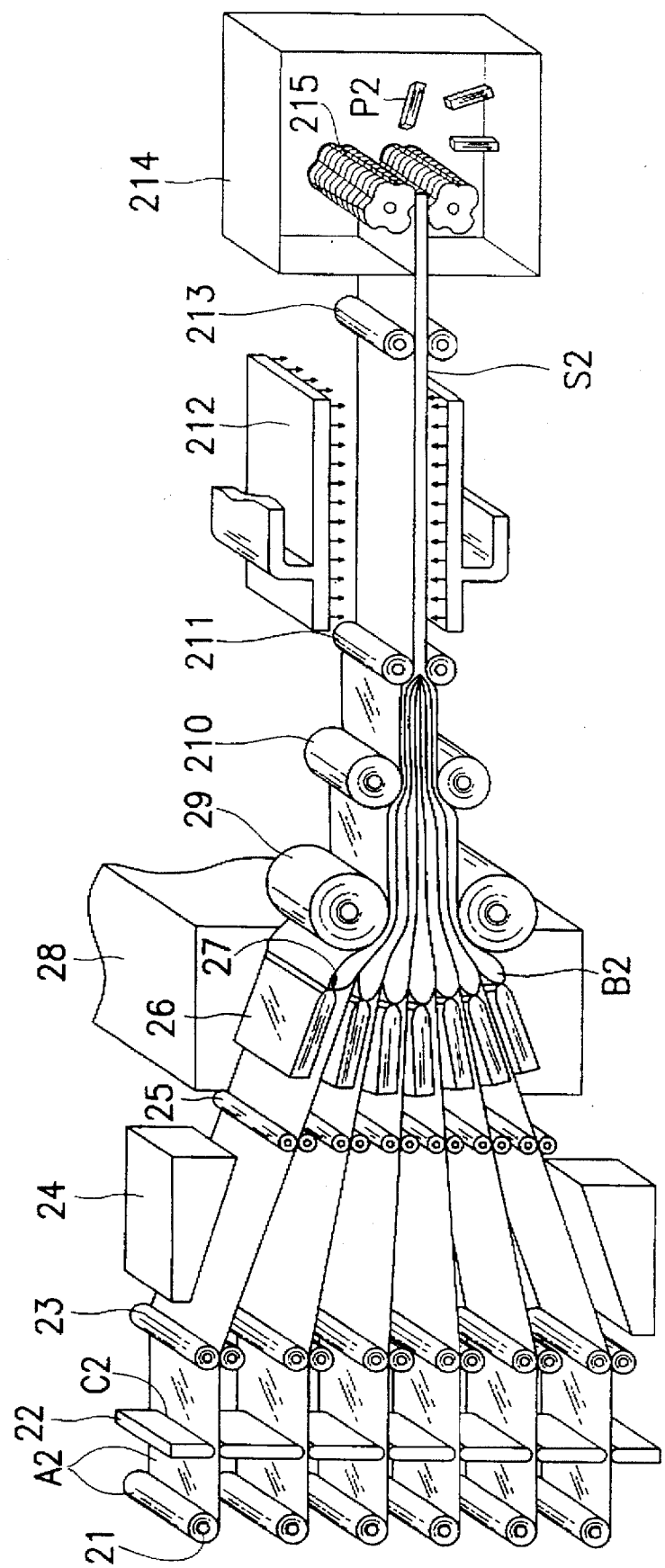
FIG. 2 shows a schematic diagram of the second preferred embodiment of the apparatus for manufacturing the aluminum laminally filled plastic pellets of the present invention.

Referring now to FIG. 2, which shows an apparatus for manufacturing the aluminum laminally filled plastic pellets according to the second embodiment of the present invention. The apparatus includes, from upstream to downstream, a conveying means 21, a spraying means 22, a first plurality of pairs of rollers 23, a drying means 24, a second plurality of pairs of rollers 25, a plurality of dies 26, three pairs of hot rollers 29, 210, and 211, a cooling means 212, and a cutting means 214.

The conveying means 21, the spraying means 22, the first plurality of pairs of rollers 23, the drying means 24, the second plurality of pairs of rollers 25, the cooling means 212, and the cutting means 214 used in the second embodiment can be the same as those used in the first embodiment, thus, descriptions of those elements are omitted here.

The plurality of dies 26 are attached on an extrusion machine 28 and exceed the quantity of the aluminum foil layers A2 by one. Each of the dies 26 at one side apart from the drying means 24 is provided with a long strip-shaped slit 27 with a width substantially equal to the width of each of the aluminum foil layers A2.

In operation, each of the plurality of aluminum foil layers A2 having a thickness of about 0.01–0.02 mm is coiled up on each of the conveying devices 21 such that the conveyed aluminum foil layers A2 are arranged substantially parallel. The aluminum foil layers A2 are then sprayed by the spraying devices 22. By the location of the spraying devices 22, the upper and lower surfaces of each of the aluminum foil layers A2 can be sprayed with coupling agent C2. Then, each of the aluminum foil layers A2 is guided by each pair of the first pairs of the rollers 23 respectively to enter into the drying means 24. The coupling agent C2 on the aluminum foil layers A2 can be dried by the drying means 24. After drying, each of the aluminum foil layers A2 is guided by each pair of the second pairs of the rollers 25 to enter into the space between each two of the dies 26.

A molten plastic matrix is extruded from the extrusion machine 28 to the dies 26. Then, the molten plastic matrix passes from each of the dies 26 through each of the long strip-shaped slits 27 on each of the dies 26 and enters into the space between each two of the aluminum foil layers A2 and the outer surfaces of the most outside two aluminum foil layers, such that the upper and lower surfaces of all aluminum foil layers A2 are moisturized and bound by the molten plastic matrix B2.

The moisturized and bound aluminum foil layers A2 are then subjected to hot rolling by at least one pair of hot rollers to hot reduce the thickness of the moisturized and bound aluminum foil layers to form an aluminum laminally filled plastic composite plate.

The hot rolling is preferably conducted more than two times, more preferably, three times to effectively reduce the thickness of the moisturized and bound aluminum foil layers and obtain the continuous aluminum laminally filled plastic composite plate of a desired thickness. Thus, the quantity of the hot rollers can be 3–5 pairs. FIG. 2 shows 3 pairs of hot rollers, 29, 210, and 211.

The moisturized and bound aluminum foil layers A2 are first subjected to the first hot rolling by the first pair of hot rollers 29. The temperature of the first pair of hot rollers 29 is a little bit higher (about 30°–60° C. higher) than that of the dies 26 so as to ensure the adherence between the plastic matrix B2 and the aluminum foil layers A2. The plastic moisturized and bound aluminum foil layers A2 are then subjected to a second hot rolling by the second pair of hot rollers 210 to reduce the thickness of the aluminum/plastic composite and further ensure the adherence between the plastic matrix and the aluminum foil layers. The temperature of the second hot rollers 210 is the same as that of the first hot rollers 29. The opening between the second hot rollers is half of the opening between the first hot rollers. The thickness reduced aluminum/plastic composite is then subjected to a third hot rolling by the third hot rollers 211 to obtain the final desired aluminum laminally filled plastic composite plate S2 with a thickness of 0.1–2 mm. The temperature of the third hot roller 211 is the same as that of the dies 26 so as to maintain the plasticity of the plastic matrix.

The aluminum laminally filled plastic composite plate S2 is introduced to the cooling means 212, such as a cooling tank or a cool water spraying device, to cool and harden the composite plate S2. And then the composite plate S2 is introduced by a pair of rollers 213 to the cutting means 214. The cutting means can be, for example, a pair of shredding steel roller blades 215 to directly cut the cooled and hardened composite plate S2 into rectangular shaped, about 0.7–2 mm wide, 5–10 mm long, and 0.1–2 mm thick aluminum laminally filled plastic pellets P2. Alternatively, the composite plate S2 can first be cut by a planar steel blade into 0.7–2 mm wide, 0.1–2 mm thick aluminum filled plastic strips, which are then cut into 5–10 long aluminum filled plastic pellets P2.

Figure 3A:
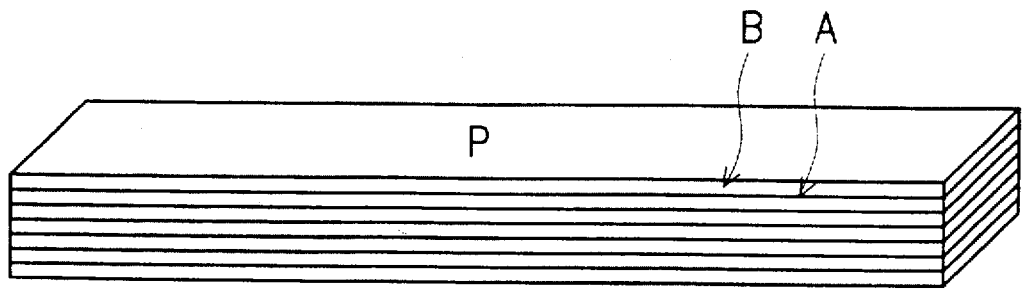
FIGS. 3(a), 3(b), and 3(c) show the structures of the aluminum laminally filled plastic pellets of the present invention.
Figure 3B:
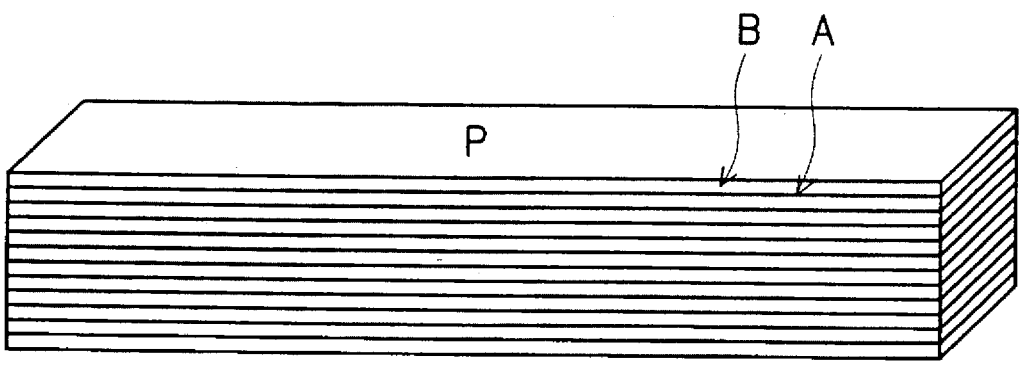
Figure 3C:
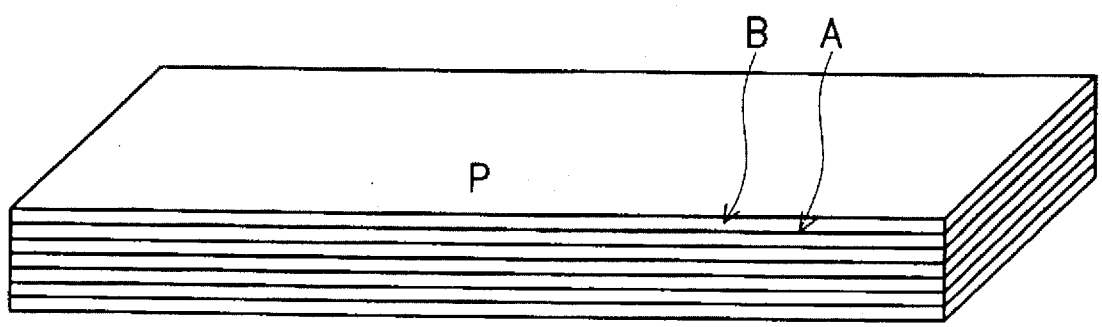

FIG. 3 shows the structures of the aluminum laminally filled plastic pellets P of the present invention. The plastic pellet can be of equal width and thickness (see FIG. 3(a)), of larger thickness than width (see FIG. 3(b)), or of larger width than thickness (see FIG. 3(c)). The structure of the plastic pellet P is a plastic/aluminum/plastic/aluminum . . . . . . /plastic/aluminum/plastic laminally filled composite pellet (plastic is shown by B, and aluminum is shown by A).

The aluminum laminally filled plastic pellets for shielding against electromagnetic interference obtained from the present invention can then be subjected to hot-pressed molding, injection molding or extrusion molding to fabricate a plastic shaped article which also provides electromagnetic shielding.

The advantages and improvements of the present invention can be described as follows.

1. The obtained aluminum laminally filled plastic pellets include 0.01–0.02 mm thick, 5–10 mm long, and 0.7–2 mm wide aluminum foil layers. That is to say, the aspect ratio of the included aluminum foil is about 250 to 1000 high. Actually, plastic pellets including aluminum foil layers with much higher aspect ratio can be obtained from the present invention by adjusting the length of the plastic pellets.
2. During the manufacturing process of the aluminum laminally filled plastic pellets of the present invention, no compounding steps is required, therefore, at least when the stage that the plastic pellets is obtained, the aspect ratio of the aluminum foil is not lost.
3. The filler starting material of the present invention is aluminum foil. Since the width of the aluminum foil can be adjusted as desired to meet the strength requirements, so the aluminum foil does not easily break during the manufacturing of the plastic pellets.
4. During the post treatment of the aluminum laminally filled plastic pellets of the present invention to fabricate various kinds of industrial products for shielding against electromagnetic interference, such as hot-pressed molding, injection molding or extrusion molding, since there is adequate thickness of plastic between each two aluminum foil layers, the dispersion of the aluminum foil is secured.
5. When the plastic pellets of the present invention are post treated to manufacture EMI shielding industrial products, since the aluminum is exposed at the edge of the plastic pellet, the aluminum foil layers contained in different plastic pellets can form electrical contact points. Even though the plastic is in molten flowing form, the plastic pellets of the present invention still have a greater chance of forming electrical contact points, therefore, the final plastic shaped article more easily forms a conductive network. However, since such an electrical contact point is only present at the edge of the plastic pellet, thus the dispersion of the aluminum foil layers is not influenced. That is to say, the aluminum foil layers contained in the plastic pellet of the present invention not only have electrical contact points but also maintain good dispersion. This has never been achieved by any other kind of conventional conductive plastic pellets.
6. When the plastic pellets of the present invention are post treated to manufacture EMI shielding industrial products, since the aluminum foil layers contained in the pellets have good dispersion, no additional compounding steps are needed. Even when the pellets are subjected to injection molding, the operation parameters can be set to the lowest degree of compounding to decrease the chance that the aluminum foil layers will break, thus, the orginal high aspect ratio of the aluminum can be maintained.
7. When the plastic pellets of the present invention are post treated to manufacture EMI shielding industrial products, since the thickness of the aluminum foil layers contained in the pellets is uniform, even when the pellets are subjected to a little extent of compounding due to injection molding, the aluminum foil layers do not easily break. In contrast, one conventional conductive plastic composite involves incorporating aluminum flakes into the plastic, as, for example, disclosed in Bulletin of Powder Metallurgy Association, Vol. 20, No. 4, p. 212–219, 1995. The obtained conductive plastic composite contains aluminum flakes of uneven thickness. The breakage easily occurs at the location of thinner aluminum flakes. Some commercially available products such as those manufactured by Transmet Company face the similar problems. Therefore, such aluminum flakes easily break due to the inevitable compounding step and the uneven thickness. The present pellets do not have the two problems, and thus, have a high aspect ratio.
8. When the plastic pellets of the present invention are post treated to manufacture EMI shielding industrial products, since the aluminum foil layers contained in the plastic have uniform length, they more easily establish an electrical network in the plastic pellets. In contrast, as mentioned in the above article in the Bulletin of Powder Metallurgy Association, the aluminum flakes have uneven length, this adversely affects the establishment of an electrical network, further affecting the electomagnetic shielding efficiency of the final conductive plastic products.
9. When the plastic pellets of the present invention are post treated to manufacture EMI shielding industrial products, since the aluminum foil maintains a high aspect ratio, only a small amount of the aluminum foil is required to achieve the EMI shielding effect. For example, to manufacture a EMI shielding product with shielding efficiency of 35 dB, only about 10% of aluminum foil need be incorporated into the plastic. In contrast, for the conventional aluminum flake-filled plastic, the aluminum flake loading should be over 30% to achieve the desired shielding efficiency. The reduction of the aluminum loading lowers the manufacturing cost, the total weight of the final EMI shielding product, the difficulty of color matching, and most importantly, does not adversely affect the mechanical properties of the final EMI shielding product.
10. The conductive filler used in the present invention can be pure aluminum foil for domestic wrapping use, which is much cheaper than the conventional conductive filler and is very easily to attain.
11. The aluminum laminally filled plastic pellets of the present invention can be subjected to hot-pressed molding, injection molding or extrusion molding to manufacture EMI shielding products, and no secondary processing is needed, therefore, meeting the requirements of mass-production.

What is claimed is:

1. A process for manufacturing aluminum laminally filled plastic pellets for shielding electromagnetic inteference, comprising the following sequential steps:

(a) lining a plurality of aluminum foil layers such that the aluminum foil layers are substantially parallel to one another, wherein the aluminum foil is made of pure aluminum or is made of aluminum alloy;

(b) coating the upper and lower surfaces of each of the aluminum foil layers with a coupling agent by immersion or spraying;

(c) drying the coupling agent-coated aluminum foil layers;

(d) introducing a molten plastic matrix to the space between each two aluminum foil layers and the outer surfaces of the most outside two aluminum foil layers, such that the upper and lower surfaces of all aluminum foil layers are moisturized and bound by the molten plastic matrix;

(e) reducing the thickness of the moisturized and bound aluminum foil layers to form a continuous laminally filled plastic composite plate; and (f) cooling and then cutting the aluminum laminally filled plastic composite plate into aluminum laminally filled plastic pellets of a predetermined size.

2. The process as claimed in claim 1, wherein step (d) the introduction of the molten plastic matrix is conducted by extrusion.

3. The process as claimed in claim 2, wherein steps (d) and (e) are together conducted by (d1) bringing the aluminum foil layers into a die attached to an extrusion machine, wherein the molten plastic matrix is extruded from the extrusion machine into the die, whereby the molten plastic matrix is introduced to the space between each two aluminum foil layers and the outer surfaces of the most outside two aluminum foil layers; and (d2) extruding the moisturized and bound aluminum foil layers out from the die to reduce its thickness so as to form a continuous aluminum laminally filled plastic composite plate.

4. The process as claimed in claim 3, wherein after step (d1) and before step (d2), further comprising decreasing the temperature of the moisturized and bound aluminum foil layers by 30°–60° C.

5. The process as claimed in claim 2, wherein step (d) is conducted by extruding a molten plastic matrix by an extrusion machine through a plurality of long strip-shaped exits, each of the exits provided on a die resepectively, into the space between each two aluminum foil layers and the outer surfaces of the most outside two aluminum foil layers.

6. The process as claimed in claim 5, wherein step (e) is conducted by hot rolling the moisturized and bound aluminum foil layers to form a continuous aluminum laminally filled plastic composite plate.

7. The process as claimed in claim 6, wherein the hot rolling is conducted more than two times.

8. The process as claimed in claim 7, wherein the hot rolling is conducted three times.

9. The process as claimed in claim 8, wherein the temperature of the first time hot rolling is 30° to 60° C. higher than the temperature of the dies such that the adherence between the plastic matrix and the aluminum foil layers is ensured.

10. The process as claimed in claim 8, wherein the temperature of the first hot rolling is the same as the temperature of the second hot rolling.

11. The process as claimed in claim 8, wherein the thickness of the aluminum laminally filled plastic composite plate obtained from the second hot rolling is half of the thickness of the composite plate obtained from the first hot rolling.

12. The process as claimed in claim 8, wherein the temperature of the third hot rolling is the same as the temperature of the dies.

13. The process as claimed in claim 1, wherein the coupling agent is selected from the group consisting of silanes, titantates, zirconates and aluminates.

14. The process as claimed in claim 1, wherein the plastic matrix is a thermoplastic.

15. The process as claimed in claim 14, wherein the thermoplastic is selected from the group consisting of acrylonitrile-butadiene-styrene (ABS), polystyrene (PS), polyphenylene oxide (PPO) and acrylonitrile-butadienestyrene/polycarbonate (ABS/PC).

16. The process as claimed in claim 1, wherein each aluminum foil layer has a thickness of about 0.01–0.02 mm.

17. The process as claimed in claim 1, wherein there are 1–10 aluminum foil layers.

18. An apparatus for manufacturing aluminum laminally filled plastic pellets for shielding electromagnetic interference, comprising:

means for conveying a plurality of aluminum foil layers such that the conveyed aluminum foil layers are arranged substantially parallel, wherein the aluminum foil is made of pure aluminum or is made of aluminum alloy;

means for spraying a coupling agent on the upper and lower surfaces of each of the aluminum foil layers, disposed downstream of the conveying means;

means for drying the coupling agent on the surfaces of the aluminum foil layers, disposed downstream of the spraying means;

a die disposed downstream of the drying means, the die being attached to an extrusion machine, the extrusion machine being capable of extruding a molten plastic matrix into the die, the die on its one wall adjacent to the drying means being provided with a first plurality of slits equal in quantity to the quantity of the aluminum foil layers, the die on its other wall apart from the drying means being provided with an extrusion exit, whereby each of the dried aluminum foil layers is capable of passing through each of the first slits respectively to enter into the die, and is capable of being moisturized and bound by the molten plastic matrix received in the die, and then the moisturized and bound aluminum foil layers are capable of being extruded through the extrusion exit to form an aluminum laminally filled plastic composite plate;

means for cooling the aluminum laminally filled plastic composite plate, disposed downstream of the extrusion exit; and means for cutting the composite plate into aluminum laminally filled plastic pellets of a predetermined size, disposed downstream of the cooling means.

19. The apparatus as claimed in claim 18, wherein the conveying means includes a plurality of conveying spools equal in quantity to the quanitity of the aluminum foil layers, whereby each of the aluminum foil layers is coiled up on each of the conveying spools respectively.

20. The apparatus as claimed in claim 18, wherein the spraying means includes a plurality of spraying devices with a quantity of one greater than the quantity of the aluminum foil layers, two of the spraying devices are respectively disposed adjacent to the most outside two aluminum foil layers, and the rest of the spraying devices are disposed between each two aluminum foil layers.

21. The apparatus as claimed in claim 18, wherein the die inside is further provided with a second plurality of slits equal in quantity to the quantity of the aluminum foil layers, such that the die is divided into a binding room and an extruding room by the second slits, the binding room is located between the first slits and the second slits, and the extruding room is located between the second slits and the extrusion exit, whereby each of the dried aluminum foil layers is capable of passing through each of the first slits respectively to enter into the binding room, being moisturized and bound by the molten plastic matrix in the binding room, and passing through each of the second slits respectively to enter into the extruding room, and then the moisturized and bound aluminum foil layers are capable of being extruded from the extruding room through the extrusion exit to form an aluminum laminally filled plastic composite plate.

22. The apparatus as claimed in claim 18, wherein between the spraying means and the drying means, further comprising a first plurality of pairs of rollers having twice the quantity of rollers as the quantity of the aluminum foil layers, whereby each pair of the first rollers is capable of guiding each aluminum foil layer respectively.

23. The apparatus as claimed in claim 18, wherein between the drying means and the die, further comprising a second plurality of pairs of rollers having twice the quantity of rollers as the quantity of the aluminum foil layers, whereby each pair of the second rollers is capable of guiding each aluminum foil layer respectively.

24. The apparatus as claimed in claim 18, wherein the distance between each of the first plurality of the slits is about 5–10 mm.

25. An apparatus for manufacturing aluminum laminally filled plastic pellets for shielding electromagnetic interference, comprising:

means for conveying a plurality of aluminum foil layers such that the conveyed aluminum foil layers are arranged substantially parallel, wherein the aluminum foil is made of pure aluminum or is made of aluminum alloy;

means for spraying a coupling agent on the upper and lower surfaces of each of the aluminum foil layers, disposed downstream of the conveying means;

means for drying the coupling agent on the surfaces of the aluminum foil layers, disposed downstream of the spraying means;

a plurality of dies attached to an extrusion machine, disposed downstream of the drying means, and having a quantity of one greater than the quantity of the aluminum foil layers, wherein each of the dies at one side apart from the drying means is provided with a long strip-shaped slit with a width substantially equal to the width of each of the aluminum foil layers, whereby each of the dried aluminum foil layers is capable of entering into the space between each two dies, the extrusion machine is capable of extruding a molten plastic matrix to the dies, and the molten plastic matrix is capable of passing through the slits on the dies and entering into the space between each two aluminum foil layers and the outer surfaces of the most outside two aluminum foil layers, such that the upper and lower surfaces of all aluminum foil layers are moisturized and bound by the molten plastic matrix;

at least one pair of hot rollers, disposed downstream of the long strip-shaped exits, for hot reducing the thickness of the moisturized and bound aluminum foil layers to form an aluminum laminally filled plastic composite plate;

means for cooling the aluminum laminally filled plastic composite plate, disposed downstream of the hot rollers; and means for cutting the composite plate into aluminum laminally filled plastic pellets of a predetermined size, disposed downstream of the cooling means.

26. The apparatus as claimed in claim 25, wherein the quanitity of the hot rollers is 3 to 5 pairs.

27. The apparatus as claimed in claim 26, wherein the quantity of the hot rollers is 3 pairs.

* * * * *